(12) United States Patent
O'Sullivan et al.

(10) Patent No.: US 9,721,215 B2
(45) Date of Patent: Aug. 1, 2017

(54) ENHANCED MANAGEMENT OF A WEB CONFERENCING SERVER

(75) Inventors: Patrick Joseph O'Sullivan, Ballsbridge (IE); Fred Raguillat, Dunboyne (IE); Edith Helen Stern, Yorktown Heights, NY (US); Barry E. Willner, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 788 days.

(21) Appl. No.: 12/827,320

(22) Filed: Jun. 30, 2010

(65) Prior Publication Data
US 2012/0004940 A1    Jan. 5, 2012

(51) Int. Cl.
G06Q 10/06    (2012.01)
G06Q 10/02    (2012.01)
G06Q 10/10    (2012.01)

(52) U.S. Cl.
CPC ............ *G06Q 10/02* (2013.01); *G06Q 10/10* (2013.01); *G06Q 10/1095* (2013.01)

(58) Field of Classification Search
CPC .................................................. G06Q 10/06
USPC ........................................................ 705/7.12
See application file for complete search history.

(56) References Cited

U.S. PATENT DOCUMENTS

| 6,279,158 | B1* | 8/2001 | Geile et al. ............. 725/126 |
| 7,007,098 | B1* | 2/2006 | Smyth .............. H04L 29/06027 348/E7.084 |
| 7,035,229 | B1* | 4/2006 | Lynch et al. ............. 370/260 |
| 7,213,050 | B1  | 5/2007 | Shaffer et al. |
| 2002/0071540 | A1 | 6/2002 | Dworkin |
| 2003/0028656 | A1* | 2/2003 | Babka .............. H04L 12/5693 709/229 |
| 2003/0061263 | A1* | 3/2003 | Riddle ..................... 709/104 |
| 2003/0108000 | A1* | 6/2003 | Chaney et al. ........... 370/260 |
| 2003/0108002 | A1* | 6/2003 | Chaney et al. ........... 370/261 |
| 2004/0015550 | A1* | 1/2004 | Nakamura ............... 709/204 |
| 2004/0044644 | A1* | 3/2004 | Brady et al. ............... 707/1 |
| 2004/0199635 | A1* | 10/2004 | Ta et al. ................... 709/226 |
| 2005/0050546 | A1* | 3/2005 | Remany et al. .......... 718/105 |
| 2005/0169253 | A1* | 8/2005 | Hu ..................... H04L 12/14 370/352 |
| 2006/0047557 | A1* | 3/2006 | Bieselin et al. ............. 705/9 |
| 2006/0245378 | A1* | 11/2006 | Jeong ............. H04Q 3/0045 370/261 |

(Continued)

OTHER PUBLICATIONS

"Sandia National Laboratories Conference Room Guidelines". Oct. 2005. retrieved from <http://www.sandia.gov/engstds/DsnManuals/Other/Conf_Rm_Guidelines_1005.pdf>.*

(Continued)

*Primary Examiner* — Kurtis Gills
(74) *Attorney, Agent, or Firm* — Steven L. Nichols; Fabian VanCott

(57) ABSTRACT

A method for enhanced management of a web conference server includes evaluation a web conference server to ascertain resources of the web conference server. The resources of the web conferencing server are partitioned into rooms, each room having an allocated portion of the resources of the web conferencing server and at least one room providing different capabilities from other rooms hosted on the web conferencing server. Access to the rooms is provided based on at least one user criterion.

20 Claims, 7 Drawing Sheets

| | | | Options within an Organization | | | Options through SaaS Offering | | |
|---|---|---|---|---|---|---|---|---|
| | | | Executive | Team | Customer | High Prem. | Med. Prem. | Standard |
| *Room Capability* | QoS | Security | High | Med | Low | High | Med. | Low |
| | | Confidentiality | High | Med | Low | High | Med. | Low |
| | | Bandwidth Priority | High | Best Effort | Med | High | Med. | Best Effort |
| | | Response Time | Short | Best Effort | Med | Short | Med. | Best Effort |
| | Functions | Live facilitator | X | | | X | | |
| | | Jump-start application | X | | X | X | X | |
| | | Social network tools | | X | X | X | X | |
| | | Instant messaging | X | X | X | X | X | X |
| | | Embedded Video | X | X | X | X | X | X |
| | | Multimedia (Webcam) | X | X | X | X | X | X |
| | | Audio only | X | X | X | X | X | X |
| | | Room size | 25 | 50 | 200 | 200 | 100 | 50 |

(56) References Cited

U.S. PATENT DOCUMENTS

| | | |
|---|---|---|
| 2007/0133438 A1* | 6/2007 | Shaffer et al. ........... 370/260 |
| 2007/0203980 A1* | 8/2007 | Andersen .................. 709/204 |
| 2008/0049922 A1* | 2/2008 | Karniely ................ 379/205.01 |
| 2008/0063173 A1 | 3/2008 | Sarkar et al. |
| 2009/0055831 A1* | 2/2009 | Bauman et al. ........... 718/104 |
| 2009/0070769 A1* | 3/2009 | Kisel ......................... 718/104 |
| 2009/0164876 A1* | 6/2009 | Logan ................. H04L 65/4015 715/201 |
| 2009/0319912 A1 | 12/2009 | Serr et al. |
| 2010/0088414 A1* | 4/2010 | Lin et al. ................... 709/227 |
| 2010/0100581 A1* | 4/2010 | Landow ............... H04L 67/02 709/203 |
| 2010/0161800 A1* | 6/2010 | Moon ........................ 709/226 |
| 2011/0125894 A1* | 5/2011 | Anderson et al. ......... 709/224 |
| 2011/0271210 A1* | 11/2011 | Jones ................. H04L 12/1827 715/753 |

OTHER PUBLICATIONS

"VidyoConferencing Administrator Guide". 2009.Vidyo, Inc. Version 1.4.*

* cited by examiner

| | | Options within an Organization | | | Options through SaaS Offering | | |
|---|---|---|---|---|---|---|---|
| | | Executive | Team | Customer | High Prem. | Med. Prem. | Standard |
| QoS | Security | High | Med | Low | High | Med. | Low |
| | Confidentiality | High | Med | Low | High | Med. | Low |
| | Bandwidth Priority | High | Best Effort | Med | High | Med. | Best Effort |
| | Response Time | Short | Best Effort | Med | Short | Med. | Best Effort |
| Functions | Live facilitator | X | | | X | | |
| | Jump-start application | X | | X | X | X | |
| | Social network tools | | X | X | X | X | |
| | Instant messaging | X | X | X | X | X | X |
| | Embedded Video | X | X | X | X | X | X |
| | Multimedia (Webcam) | X | X | X | X | X | X |
| | Audio only | X | X | X | X | X | X |
| Room Capability | Room size | 25 | 50 | 200 | 200 | 100 | 50 |

*Fig. 2A*

Differential Billing

| Room Capability | | | Executive | Billing Score |
|---|---|---|---|---|
| QoS | | Security | High | 5 |
| | | Confidentiality | High | 5 |
| | | Bandwidth Priority | High | 15 |
| | | Response Time | Short | 15 |
| Functions | | Live facilitator | X | 30 |
| | | Jump-start application | X | 5 |
| | | Social network tools | | 0 |
| | | Instant messaging | X | 5 |
| | | Embedded Video | X | 5 |
| | | Multimedia (Webcam) | X | 5 |
| | | Audio only | X | 5 |
| | | Score Subtotal | | 95 |
| | | Room Size | | 25 |
| | | Cost per Month = (Score Subtotal * Room Size)/100 | | $23.75/mon. |

Fig. 2B ive tool which can be used to connect remote users through the internet. A web conference server hosts a web conferencing application which provides the web conference functionality. The web conference server can typically support a plurality of web conferences and provides the same functionality, quality-of-service, and resource allocation for each of the web conferences. This can be an inefficient use of the web conference server's resources. Many of the participants do not want or use the complete functionality of the web conference application. The resources allocated to provide this unused functionality are idle. Further, many of the presenters would prefer to pay less for a lower quality of service during their presentation. However, because each of the web conferences is allocated the same functionality and resources, the presenters have a limited number of choices and the resources within the web conference server are not efficiently used or monetized.

BRIEF SUMMARY

A method for enhanced management of a web conference server includes evaluation of a web conference server to ascertain resources of the web conference server. The resources of the web conferencing server are partitioned into rooms, each room having an allocated portion of the resources of the web conferencing server. Access to the rooms is provided based on at least one user criterion.

A web conferencing server includes partitions within the web conferencing server forming a plurality of web conferencing rooms. Each of the partitions includes allocated portions of processor capability, non-volatile memory capability, and communication bandwidth sufficient to fulfill a quality of service level associated with each of the rooms. At least a portion of the web conferencing rooms on the web conferencing server have different capabilities than the other rooms on the web conferencing server.

A computer program product for enhanced management of a web conferencing server includes a computer readable storage medium having a computer readable program code. The computer readable program code is configured to partition the capabilities of the web conferencing server to rooms, each room having an allocated portion of non-volatile memory and processor capability within the web conferencing server. At least a portion of the web conferencing rooms on the web conferencing server have different capabilities than the other rooms on the web conferencing server. Access to the rooms is provided based on at least one user criterion.

BRIEF DESCRIPTION OF THE SEVERAL VIEWS OF THE DRAWINGS

The accompanying drawings illustrate various embodiments of the principles described herein and are a part of the specification. The illustrative embodiments are merely examples and do not limit the scope of the claims.

FIG. 2A is a chart showing illustrative partitioning of a web conference server into rooms, according to one embodiment to principles described herein.

FIG. 2B is a chart showing illustrative differential billing for a partitioned web conference room, according to one embodiment to principles described herein.

Throughout the drawings, identical reference numbers designate similar, but not necessarily identical, elements.

DETAILED DESCRIPTION

Figure 1:
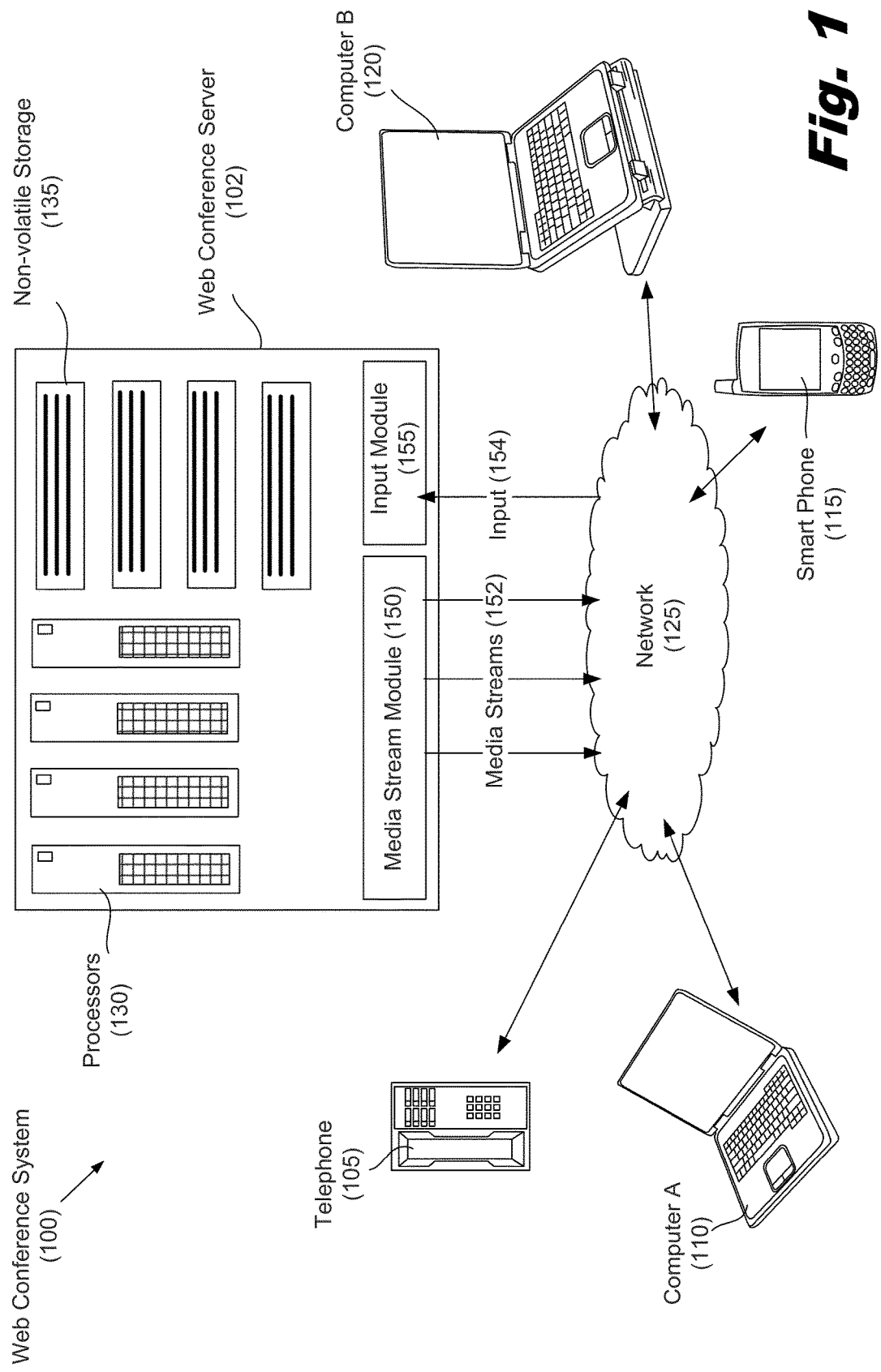
FIG. 1 is a diagram of an illustrative web conferencing system, according to one embodiment of principles described herein.

Web conferencing is a versatile tool which can be used to connect remote users through the interne. A web conference server hosts a web conferencing application which provides the desired interconnectivity and functionality. The web conference server can typically support a plurality of web conferences and provides the same functionality, quality-of-service, and resource allocation for each of the web conferences. This can be an inefficient use of the web conference server's resources. Many of the participants do not want or use the complete functionality of the web conference application. The resources allocated to provide this unused functionality is idle. Further, many of the presenters would prefer to pay less for a lower quality of service during their presentation. However, because each of the web conferences is allocated the same functionality and resources, the presenters have a limited number of choices and the resources within the web conference server are not efficiently utilized.

The present specification discloses the partitioning of the resources of a web conference server into rooms. Each room has a number of characteristics which determine how much of the web conference server's resources are allocated to the room. The rooms may have a variety of quality-of-service targets and functionalities. For example, the various rooms on a given web conference server may each be unique and have varying levels of allocated resources. These rooms can be selected based on the requirements of a particular group of users. For example, in a company when a web conference is hosted for a group of executives, security, confidentiality, and response time may be significant factors in allocating the resources. In another web conference, a collaborative team may work on an ongoing project. Significant factors in the allocation of resources in this example may include a relatively high allocation of non-volatile memory to store ongoing drafts, presentations, and other collaborative documents.

The partitioning of the web conferencing server into rooms may provide a number of benefits, including more efficient allocation of resources, more cost effective delivery of web conferencing functionality to the users, and the ability to more precisely monetize the delivery of web conferencing services.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having a computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with a computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 shows one illustrative embodiment of a web conferencing system (100). In this example, the web conference system includes a web conference server (102) and a network (125). Also attached to the network are various user devices such as telephone (105), computer A (110), smart phone (115), and computer B (120). The web conference server (102) hosts the web conference and provides the various media streams (152) which are received by the user devices (105, 110, 115, 120).

In this embodiment, the web conference server (102) includes processors (130), nonvolatile storage (135), a media stream module (150), and an input module (155). According to a one illustrative embodiment, the processors (130) could be blade servers. Together, the processors (130) provide the computational capability of the web conference server (102). The nonvolatile storage (135) similarly provides the memory capacity of the web conference server (102). In this example, the nonvolatile storage (135) is made up of a number of hard drives.

During a web conference, the web conference server (102) stores the content of the web conference on the nonvolatile storage (135) and streams this content in the processors (130), which in turn drive the media stream module (150). The media stream module (150) outputs media streams (152) to the network (125). The network (125) may include a variety of technologies including cellular technology, internet networks, and/or telephone networks. The various user devices (105, 110, 115, 120) access the network (125) through the appropriate compatible technology. For example, the telephone (105) may access the media streams (152) through a telephone network. The telephone (105) may receive an audio only media stream. Computer A (110) may receive both audio and video information through an Ethernet connection. Smartphone (115) may receive a mobile media stream (152) which is streamed over wireless or cellular networks. Similarly, computer B (120) may receive the appropriate media stream (152). The input channel (154) may provide control information and inputs from the various user devices (105, 110, 115, 120). For example, the user devices (105, 110, 115, 120) may include video feeds of the participants. These video feeds could be included in the input channel (154). The inputs (154) are received by the input module (155) which then passes the appropriate input information to the processors (130) and the nonvolatile storage (135). This input is then integrated into the media streams (152) as appropriate.

Conventionally, web conference servers provide all the same functionalities and capabilities for all the users. As discussed above, providing the same complete functionality for each user can be an ineffective use of the web conferencing server's (102) capability and resources. Providing the same functionality to all the users also overlooks the users' specific need for the functions and quality of service provided by the web conferencing server (102). For example, if a web conference consists primarily of users who connect to the network (125) using an audio only device, allocation of a large portion of the processors (130) to generate video data is an ineffective use of the web conferencing server's (102) resources. In another example, the web conference server (102) may be configured to provide web conferencing services to 100 or more users during a particular web conference. However, if only 5 users participate in a given web conference, the extra resources which have been allocated to accommodate 100 users have been wasted. Additionally, a portion of the processor and bandwidth of the web conference server (102) may be allocated to security functions such as encryption. In web conferences where security is not an issue, these resources have been wasted.

Another criterion which may be used to evaluate the needs of users on a web conference is the delay experienced by the users in receiving data from the web conference system (100) through the network (125). The delay experienced by a user is a function of a number of factors, including the processing delays in the web conference server (102), communication delays, or delays generated by the user device. The processing delays of the web conference server (102) are related to the time required by the processors (130) to manipulate the data and generate the media streams (152).

As discussed above, by providing all the capabilities of the web conference server (102) to all the users, the users may unfavorably pay for functionality and resources which they do not use. According to one illustrated embodiment, the resources of the web conference server (102) can be divided into various rooms which have varying levels of capability and dedicated resources. By dividing the resources of the web conference server (102) into rooms with varying capabilities, the user can select the room which is most appropriate for their web conference meeting.

For example, the entity which is hosting the web conference can positively influence the delay experienced by users by allocating processor capability to a given web conference to decrease the processing times and/or by allocating a larger portion of the connection bandwidth between the web conference server (102) and the network (125) to the web conference. Where the web conference server (102) is divided into a number of rooms, the amount of processing power and connection bandwidth associated with a given room can vary. In some web conferences, delay may not be that important. For example, where an audio only presentation is being broadcast to a number of non-interacting participants, delay may not be an issue. The users receive and listen to the audio presentation as it arrives at their devices. However, where two media streams (152) need to be synchronized, such as video and audio, the amount of delay in the system can be more important. Additionally, in web conferences where users are interacting, delays can be more noticeable.

FIG. 2A is a chart which shows a number of illustrative rooms within a web conference server (102, FIG. 1). The rooms are listed across the top of the chart and the rooms capabilities are listed along the vertical axis of the chart. There are two groups of rooms shown. The group on the left contains examples of rooms within an organization and the group on the right shows examples of rooms hosted by a provider of a Software-as-a-Service (SaaS) offering. In the options within an organization category, there are three illustrative rooms shown: executive, team, and customer. In the options through the SaaS offering, there are also three illustrative rooms shown: high premium, medium premium and standard.

The functions and capabilities of each of these rooms are listed on the vertical axis of the graph. The room capabilities include quality of service criteria and a number of functions which can be used within the web conference. The Quality of Service (QoS) criteria includes security, confidentiality, bandwidth priority, and response time. Security refers to measures taken to control access to the web conference and its associated materials. For example, communications may be encrypted to secure the web conference from outside intrusions. Other security measures may include: requiring voice identification of the various participants, the entry of a password to access the web conference, or verification of the position of employee within a company as defined in a Lightweight Directory Access Protocol (LDAP) server.

Confidentiality refers to various measures which control the distribution of the content of the web conference. For example, copies of the presentation which are stored on local machines or servers may be deleted following the conference. Bandwidth priority refers to the claim of a given web conference to the available bandwidth in the connection between the web conference server and the network. The response time of the web conference server refers to the processing latency of the web conference server in responding to requests. In this embodiment, the response time refers solely to the web conferencing server's response time rather than the overall latency between the web conferencing server and a user device.

A number of illustrative functions are also shown in FIG. 2A. These functions include a "room size" function which refers to the number of people that a given web conference room is configured to support. Another function is an "audio only" function which provides an audio stream to users who are not participating with a device that supports visual media streams. The "audio only" stream may include supplemented audio. For example, the supplemented audio may include automated reading of the page number or content of the presentation. This will enable an audio only user to follow the presentation on a hard copy without becoming disoriented. The audio only feed may also include identification of the person who is currently presenting or speaking.

The "multimedia" function may include a variety of types of media including a webcam which shows the person who is speaking or otherwise participating in the web conference. The "embedded video" function allows the user or presenter to embed a video within the presentation. For example, a video may be embedded in the presentation for product demonstration purposes.

The "instant messaging" function allows the participants to type text messages to each other anonymously or to a bulletin board to communicate during the presentation. Social networking tools may also be functions that are available within the web conferencing application. The social networking tools may provide team building or organizational tools which allow the users to create or modify social networks within the web conferencing application.

The "jumpstart application" function may provide a number of tools that make it easier to create and present a web conference. For example, the jumpstart application function may provide the company's logo and header at the top of the presentation, as well as configuring the presentation to meet any organizational or other requirements. The "live facilitator" function may be used for very high end conferences where an IT professional monitors the webconference to ensure that the web conference runs smoothly, that the desired functionality is present and functional, and the timing of the various events occur properly. A variety of other functions or quality of service criteria measures could be included in various rooms. By way of example and not limitation, a variety of recording functions could be used within the web conferencing application. These recordings could be audio and/or visual recordings. For example, the audio recording could record multiple conversations which occur during the presentation and the visual recording could capture a number of screen shots when new visual information is presented or at fixed time intervals. In some embodiments, the video feeds and presentations could also be recorded.

As discussed previously, not all of the web conferencing rooms will require all the functionality which may be present on the web conferencing server. For the example, in the "executive" room, the quality of service measures listed in FIG. 2A show that the security, confidentiality and bandwidth priority are all at high levels. The response time is also short. The executive room includes most of the functions that are available. However, in this example, the room size is limited to 25 participants and there are no social networking tools present.

The "team" room serves different functions and requires only medium security and confidentiality. The bandwidth priority and response time are listed as "best effort." The term best effort means that there are no dedicated resources within the web conferencing server that are allocated to the team room. The team room uses whatever bandwidth is available and unallocated within the web conferencing server. This may result in response times or bandwidth communications which are vary over time. When the bandwidth becomes limited, a variety of actions can be taken to preserve the essential functions of the web conference. For example, where multimedia streams are present in the web conference, the video rates and quality can be degraded to preserve the audio portion of the web conference and refresh the display of the presented slides. The team room does not include the live facilitator or jumpstart application functions. However, it does include the social networking tools. These social network tools can be used to create or organize team structures during the web conference. The team room also includes instant messaging, embedded video, multimedia functions, audio only functions, and a room size which accommodates up to 50 team members. The functionality included in the team room accommodates team work within the organization where security and confidentiality are important but not critical and some interruption to the team's web conference is allowable. The functions available in the team room allow for efficient collaboration by team members but do not have the high end overhead associated with the executive room.

The final room in the organizational web conferencing server is the customer room. In this example, the purpose of the customer room is to make presentations to customers of products and services which are available within the organization. Consequently, it is important that there be some guarantee of bandwidth and response time to provide the customers with a quality web conference experience. However, during these public meetings the confidentiality and security of the presentation is not as great as in other situations. The functions included in the customer room include jumpstarting the presentation and social networking tools which can be used to integrate the customer into the organization or sales structure. Instant messaging, embedded video and multimedia can also provide benefit to the customer in communicating and understanding the products and services of the organization. The audio only portion can be used to reach customers who are unavailable for a full multimedia presentation. The room size is large so that a large number of customers can be reached during a given web conference.

As discussed above, the left hand portion of the chart in FIG. 2A shows options which could be through a SaaS offering. In SaaS, the web conferencing server (102, FIG. 1) is hosted remotely and customers request a room for a particular web conference or purchase ongoing access from the third party provider. In the SaaS offering, there are three rooms: a high premium room, a medium premium room and a standard room. The high premium room provides high quality of service measures and all the functionality which is present within the web conferencing server. It also provides a room size which is large enough to accommodate most web conferences. The medium premium room strikes a balance between function and price and provides all but the most expensive functions. The security, confidentiality, bandwidth and response time are all set at "medium" to provide acceptable service for customers who select the medium premium option. The standard room provides a cost effective option for customers who have no particular security, confidentiality or other quality of service concerns and are not interested in using some of the higher level functionality within the web server.

FIG. 2B is a chart showing illustrative differential billing for a partitioned web conference room. In this chart, differential billing for the executive room is shown. To create the differential bill, a billing score is calculated based on the quality of service levels and functions selected by the organization. The score may reflect the resources required to execute the selected quality of service and functions. For example, a "short" response time may require significant resources and is assigned 15 billing points. If the organization were to select a "best effort" response time, significantly less resources would be dedicated to the room and only 5 billing points would be assigned.

Similarly, the various functions are assigned various billing points based on their cost or perceived value. For example, supplying a live facilitator is a significant cost and is assigned 30 points. In this example, other functions are assigned 5 points. The billing points are summed to obtain a score subtotal of 95. An equation is used to obtain cost per month. In this example, the equation produces the monthly cost by multiplying the score subtotal by the room size and dividing by 100. The resulting cost per month for the executive room is $23.75.

As used in the specification and appended claims, the term "differential billing" refers to billing for specific functions and quality of service of partitioned web conferencing room. According to one embodiment, the user can selectively choose the functions present in the room and the quality of service provided. The cost associated with the room is then based on the functions and quality of service levels selected by the user. Consequently, the user can customize the room to meet the user's needs and budget. This correlation between room capabilities and cost can be directly presented to the user during configuration of the room.

FIG. 2B is only one illustrative example of differential billing for a partitioned web conferencing room. A variety of other techniques and equations could be used to generate a differential pricing structure based on the functionality and quality of service present in a partitioned web conferencing room. Additionally, a variety of factors which are not illustrated in FIG. 2B could be used in calculating a differential price for a room. For example, quantity discounts could be given for organizations which request multiple web conferencing rooms.

In some embodiments, cloud computing architectures and concepts can be incorporated into the web conferencing system. In cloud computing, multiple customers share the same computing resources. These computing resources are allocated to the customers based on a number of factors, including the quality of service and functions selected by the customer for a given room.

Figure 3:
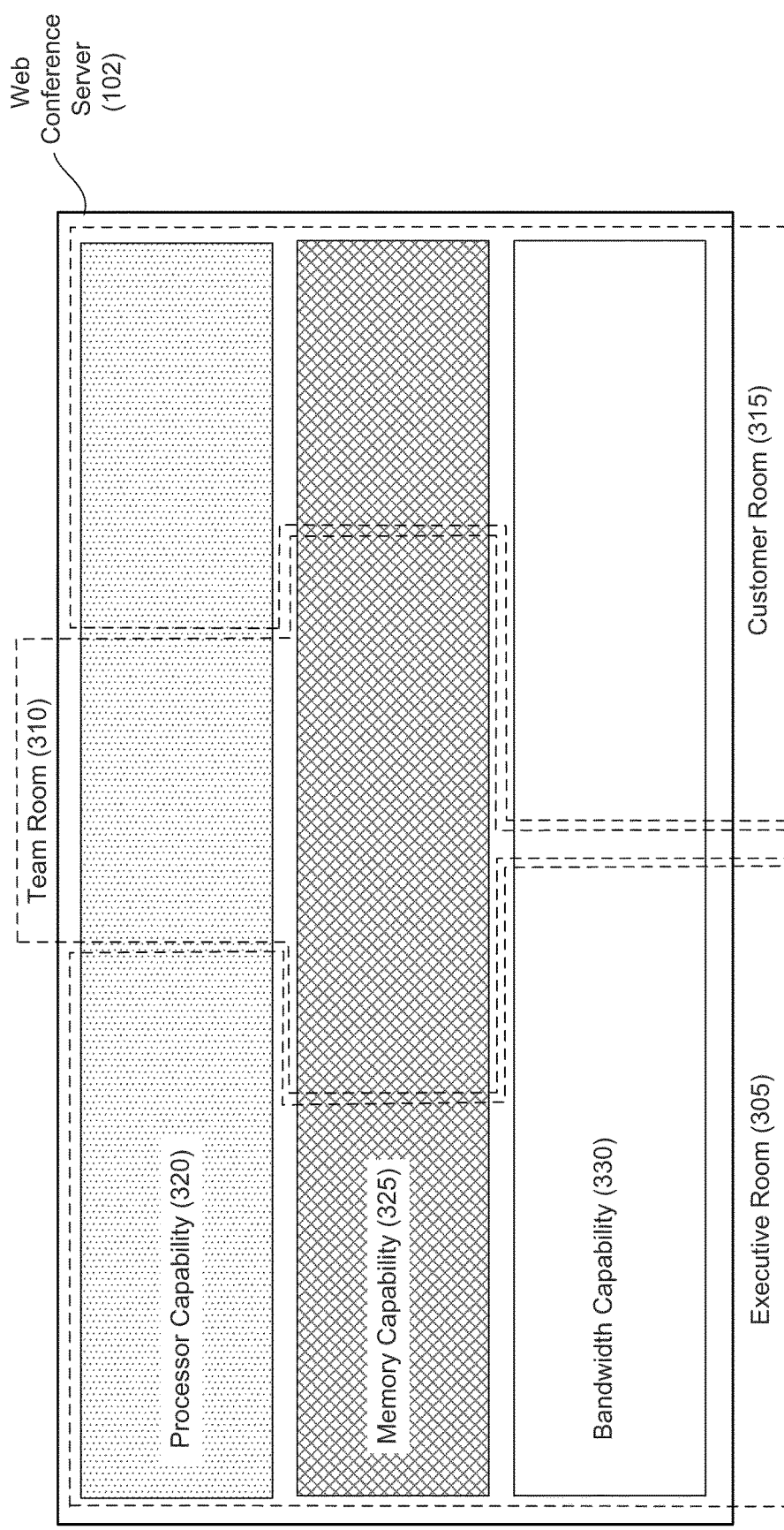
FIG. 3 is a diagram showing the partitioning of web conference server resources into rooms, according to one embodiment of principles described herein.

FIG. 3 shows one illustrative embodiment of a web conference server (102). The horizontal boxes show the processor capability (320), the memory capability (325), and the bandwidth capability (330) which are present within the conference server. As discussed above, the processor capability (320) may be the result of a conglomeration of a number of the individual processors or multi core computing devices. These may be segmented on a hardware or software basis to provide the desired amount of processing power for the various rooms within the web conference server (102). The memory capability (325) illustrates the non-volatile storage capacity of hard drives on the web conferencing server (102). This non-volatile storage can be used to store information such as pictures, documents, videos, slide presentations or other data which is important to create and present a web conference. The bandwidth capability (330) refers to the available transmission capacity of the communication link between the web conference server (102) and network (125, FIG. 1).

FIG. 3 illustrates the portion of these three illustrative resources (320, 325, 330) which are allocated to the executive room (305) using a dashed box. The dashed box includes slightly more than a third of the processing capability (320) of the web conferencing server (102), about a third of the memory capability (325) of the web server (102) and almost half of the bandwidth capability (330) which is present on the web conferencing server (102). These allocations represent the resources which are required to deliver the quality of service and functionality which are part of the executive room (305). The relatively high amount of processor capability (320) which is allocated to the executive room (305) may be used to provide security such as encryption and shorten the response time to commands. The processor (320) allocation may also be used to support imbedded video, instant messaging and other functions available in the executive room (305). Although the executive room (305) size is only for 25 individuals, the other requirements, particularly the security and response times, require a relatively high amount of processing resources be dedicated to the executive room (305). Because the bandwidth priority of the executive room is high, a relatively large portion of the bandwidth capability (330) of the web conference server (102) is allocated to the executive room (305).

The team room (310) is also illustrated as a dashed box which encompasses a portion of each of the processor capability (320), the memory capability (325) and the bandwidth capability (330) which are available on the web conference server (102). The team room (310) has a moderate amount of processor capability (320) and a larger amount of memory capability (325) than any other room in this particular example. The larger memory allocation may be used by the team to store presentations or data which relate to ongoing projects. The processor allocation may be used for security and to provide the other functionality which is present in the team room (310). As shown in FIG. 2A, the team room (310) has a room size of 50. The team room (310) has very little bandwidth capability (330) assigned to it. This is because the bandwidth priority and response time are best effort. This allows the team room (310) to use bandwidth capability (330) which is allocated to other rooms when the other rooms are not in use. By dynamically allocating bandwidth capability (330), the resources of the web conferencing server (102) can be more efficiently utilized.

The customer room (315) includes a relatively large portion of the bandwidth capability (330) and smaller portions of the memory capability (325) and processor capability (320). As shown in FIG. 2A, the customer room (315) can support a large number of participants, which may require a greater amount of bandwidth than rooms with smaller capacities. Because it is anticipated that the customer room (315) is used primarily for presentational purposes, the processor requirements and memory capability are relatively low. For example, it is not anticipated that the customer room (315) would include large volumes of multimedia data. For example, it is unlikely that a video feed of each participant would be included in the multimedia feeds. Instead, the presenter would be the only person using a webcam and that video feed would be incorporated into the data streams for all the customers.

The web conferencing rooms described in FIGS. 2A, 2B, and 3 are only illustrative examples. A variety of other room configurations could be created by partitioning the resources of the web conferencing server in different ways. For example, a much larger portion of the bandwidth capability may be allocated to a customer room to ensure that the customers have a high quality and very stable web conferencing experience during a product demonstration.

Figure 4:
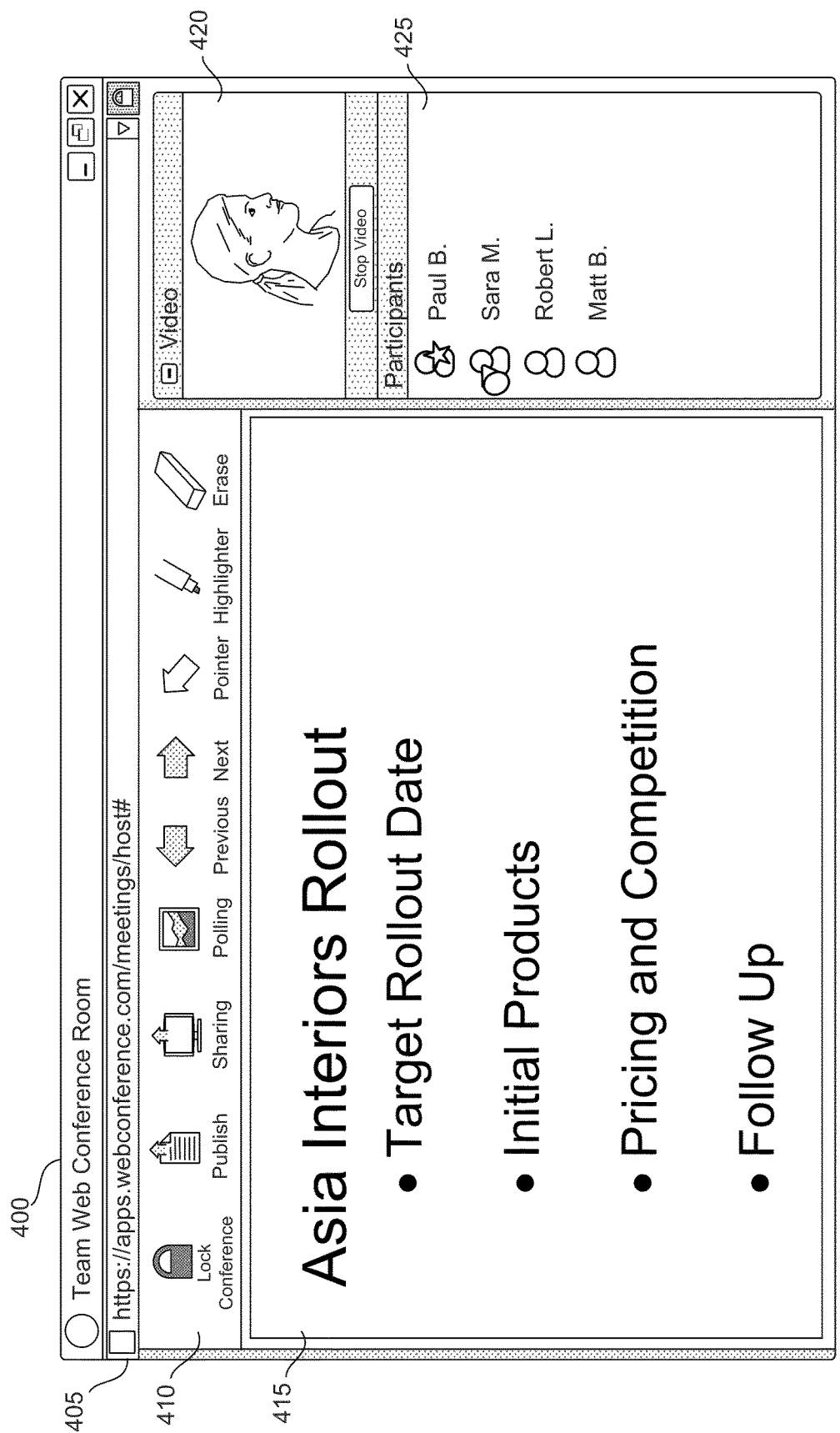
FIG. 4 is a screen shot of an illustrative web conferencing application operating in a team web conference room, according to one exemplary embodiment of principles described herein.

FIG. 4 shows an illustrative screen shot (400) from a web conferencing application in a team web conference room. The screen shot (400) includes a web address (405), a toolbar (410), a presentation box (415), a video feed (420) and a participant box (425). The various functions which are available within the team web conference room are shown in the toolbar (410). In this particular example, the participant box (425) shows that Paul is the moderator who has called the team meeting and that Sara is currently the presenter of the information in the slide. The video (420) shows Sara as she is discussing the content of the slide (415).

Figure 5:
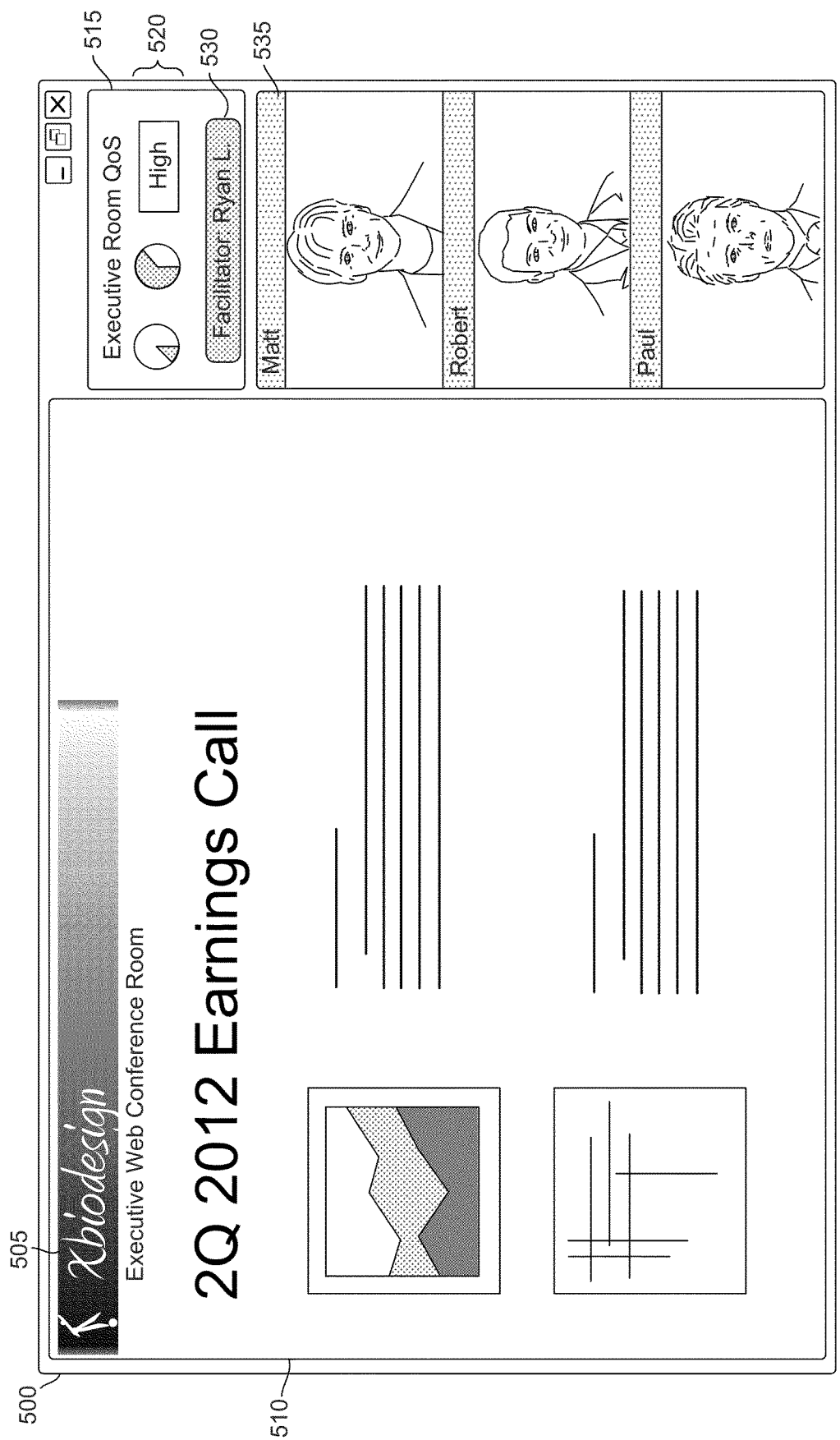
FIG. 5 is a screen shot of an illustrative web conferencing application operating in a executive web conference room, according to one exemplary embodiment of principles described herein.

FIG. 5 shows an illustrative screen shot (500) of an executive web conference room during a presentation. In this embodiment, the screen shot includes the presentation slide (510), the executive room quality of service box (515), and three video feeds (535). A number of functions which were not present in the team web conference are shown in the executive web conference room. For example, the executive web conference room includes a live facilitator (530). The executive web conference room also includes a jumpstart function which places the logo (505) of the company at the top of the presentation.

In this example, the CEO, Matt, has called the meeting with two of his vice presidents, Robert and Paul, to discuss the $2^{nd}$ quarter of 2012 earnings call which is upcoming for their company. In this situation, it is advantageous for all the executive members to see each other through the video feed (535). Consequently, there are video feeds (535) for Matt, Robert and Paul. Because this web conference is important, they have also requested that a facilitator (530), Ryan, set up and monitor the web conference room to ensure that the call goes smoothly. The button in the quality of service box (515) allows the participants to contact Ryan directly and in real time. For example, pressing the button to contact Ryan may replace the quality of service box (515) with a video and audio feed which allows direct communication with Ryan. The quality of service box (515) also includes quality of service indicators (520) which display the quality of service which is currently being delivered. For example, the quality of service indicators (520) may include dials or other indicators which address the security, confidentiality, bandwidth, and response time of the executive web conference room. Because the web conference is being facilitated by Ryan (530), there are a number of elements which need not be present on the display presented to the participants. For example, there is no web conference address or toolbar needed. The facilitator (530), Ryan, has control over these functionalities and can configure them as needed throughout the executive web conference.

Figure 6:
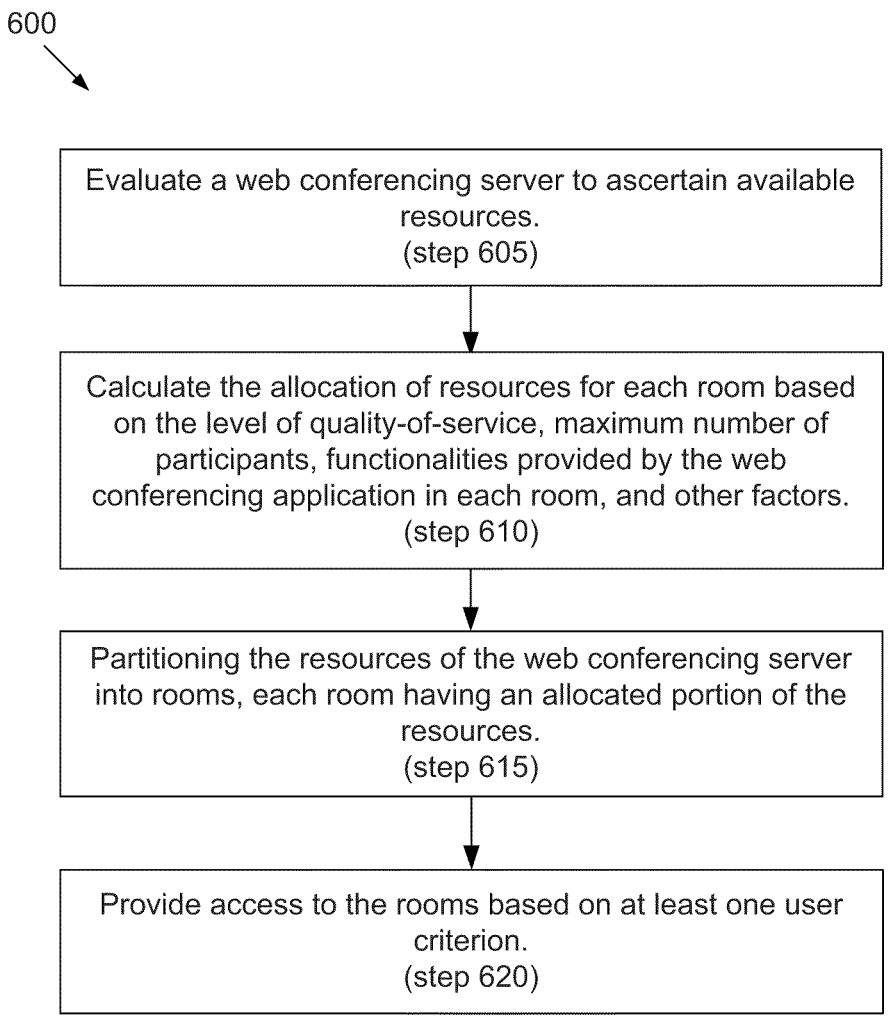
FIG. 6 is a flowchart of one illustrative method for enhanced management of a web conferencing server, according to one embodiment of principles described herein.

FIG. 6 is a flowchart of an illustrative method for enhanced management of a web conferencing server. The web conferencing server may be owned by an organization which uses the web conferencing server to accomplish its organizational purposes or the web conferencing server may be used under a Software-as-a-Service (SaaS) contract. The web conferencing server is evaluated to ascertain its resources (step 605). For example, the web conferencing server could be evaluated to determine the amount of available memory, processing capability, and other resources. The response time and available bandwidth of the web conferencing server could also be tested. The amount of available memory, processing capability, and bandwidth which can be used to host a web conference will typically be less that the actual capabilities of the web conferencing server due to operating system requirements and overhead functions.

The allocation of resources for each room is calculated based on the level of quality-of-service, maximum number of participants, functionalities provided by the web conferencing application in each room, and other factors (step 610). The resources are the partitioned into rooms, with each room having an allocation of portion of the resources of the web conferencing server (step 615). According to one illustrative embodiment, a plurality of rooms are created by combining resources from the web conferencing server, with each room having different capabilities. According to one illustrative embodiment, each of the rooms have sufficient allocated resources so that when the rooms are used at a maximum capacity, each of the rooms meets its minimum the quality of service criteria.

In some embodiments, this partitioning may be statically tied to the capabilities of the web conferencing server. As long as the capabilities of the web conferencing server remain the same, the resource allocations for the various rooms remain the same. In other embodiments, at least one resource of the web conferencing server is dynamically allocated as the needs change during a web conference. For example, the communication bandwidth can be dynamically allocated during a web conference. This allocation can be based on a number of factors including: the amount of bandwidth available within the web conference server, the access priority of the room that is hosting the web conference, and functions which are currently demanding bandwidth in the web conference. In other embodiments, the partitioning of the resource of the web conference server can be performed at the time a room is requested by a SaaS user or shortly before the web conference begins. The amount which is charged can be varied based on the capabilities of the room selected by the SaaS user.

Access to the rooms is conditioned on at least one user criterion (step 620). The user criteria may include one or more of the following: the payment of a fee to access a room, the user's position within a hierarchal structure of an organization, characteristics of the web conference the user desires to create, or other factors. In some embodiments, the configuration options available to a user within a room are limited by the resources which can be allocated to that room.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for enhanced management of a web conferencing server comprising:
    partitioning, by a hardware-based computing system, the resources of the web conferencing server into a plurality of preconfigured rooms by calculating a static allocation of resources for each room based on a level of quality of service in each room, a maximum capacity of participants in each room, and functionalities provided by the web conferencing application in each room, such that the static allocation of computing resources is sufficient to provide the functionalities for the maximum capacity of participants with the quality of service for each room, wherein the static allocation of resources for each web conferencing room is a division of computing capabilities of the web conferencing server and does not change unless the computing capabilities of the web conferencing server change, in which at least one room comprises different capabilities from other rooms hosted on the web conferencing server, and wherein an audio-only feed provided by the web conferencing room identifies a speaker using an audible signal added to the audio-only feed and includes audible identification of page number in an accompanying presentation when the speaker changes pages; and
    providing access to each of the rooms based on at least one user criterion.

2. The method of claim 1, in which each room is allocated resources such that when each room is used at a predetermined maximum capacity, the static allocation of resources for each room meets a minimum quality of service associated with each room.

3. The method of claim 1, in which the rooms are web conferencing rooms, the method further comprising pricing the web conferencing rooms using differential billing based on functionality and quality of service selected by a user and provided by the web conferencing rooms.

4. The method of claim 1, in which partitioning of the resources of the web conferencing server into rooms is statically tied to the capabilities of the web conferencing server and preconfigures the rooms with unique sets of capabilities and features.

5. The method of claim 1, further comprising dynamically allocating at least one resource of the web conferencing server from one room to another room as a web conference progresses, the at least one resource comprising one of: processor capability, memory capability, and communication bandwidth.

6. The method of claim 5, in which partitioning of communication bandwidth is dynamically allocated during the web conference, the dynamic allocation being based on amount of bandwidth available within the web conference server, an access priority of the web conference, and desired amount of communication bandwidth.

7. The method of claim 1, in which a user criterion for access to a web conferencing room is a user's position within a hierarchal structure of an organization.

8. The method of claim 1, in which the user criterion for access to a room is a characteristic of a web conference a user will host.

9. The method of claim 1, in which configuration options available to a user within a web conferencing room are limited by a predetermined amount of computing resources that are statically allocated to the web conferencing room.

10. The method of claim 1, further comprising restricting user access to a web conferencing room based on the web conferencing room's electronic capabilities.

11. The method of claim 1, in which web conferences hosted on the web conferencing server are provided under a Software-as-a-Service (SaaS) contract.

12. The method of claim 11, further comprising charging different amounts for rooms hosted by the web conferencing server based on statically allocated computing and communication capabilities of each room.

13. A web conferencing server comprising:
    a processor;
    a non-volatile memory; and
    partitions within the web conferencing server forming a plurality of web conferencing rooms with different sets of capabilities and features, each of the partitions comprising a statically allocated portion of processor capability, non-volatile memory capability and communication bandwidth sufficient to fulfill a quality of service level associated with each of the rooms; at least a portion of the web conferencing rooms on the web conferencing server having different capabilities than the other rooms on the web conferencing server, in which allocation of processor capability, non-volatile memory capability, and communication band width are statically tied to the capabilities of the web conferencing server, providing a web conferencing room with a predetermined delay,
    wherein access to the web conference room is provided by voice recognition and the web conferencing server provides a first and a second audio teed for the web-conference room and the second audio feed contains supplemental audio identifiers not found in the first audio feed, including audible identification of the speaker based on voice recognition used to access the conference room.

14. A computer program product for enhanced management of a web conferencing server, the computer program product comprising:
    a non-transitory computer readable storage medium having computer readable program code embodied therewith, the computer readable program code comprising:
    computer readable program code configured to statically partition the capabilities of the web conferencing server to preconfigured web conferencing rooms, each web conferencing room having a dedicated portion of non-volatile memory and processor capability within the web conferencing server based on a maximum number of participants using functionality provided by the web conferencing room; at least a portion of the web conferencing rooms on the web conferencing server having different capabilities than the other web conferencing rooms on the web conferencing server, wherein the web conferencing room exists with its allocated resources prior to a user service request; and
    computer readable program code configured to provide access to the web conferencing rooms based on user criteria and an audio only feed from the conference room contains supplemented audio including automated reading of presentation content, the supplemental audio including automated audible identification of a speaker, wherein the speaker's identity is verified when providing access to the conference room.

15. A web conferencing server comprising:
a processor;
a non-volatile memory; and
partitions of capabilities within the web conferencing server forming a plurality of web conferencing rooms, each of the partitions comprising statically allocated portion of processor capability, non-volatile memory capability and communication bandwidth sufficient to fulfill a quality of service level associated with each of the rooms; at least a portion of the web conferencing rooms on the web conferencing server having different capabilities than the other rooms on the web conferencing server, wherein the statically allocated portion of processor capability, non-volatile memory capability and communication bandwidth are static as long as the capabilities of the web conferencing server remain unchanged, and wherein access to webconferencing rooms depends on a user's position in a hierarchy and an audio feed of the webconferencing room uses supplemental audio to identify a speaker based on the verification of the speaker's identity when providing access.

16. The web conferencing server of claim 15, in which a first resource of the web conferencing server is statically allocated such that each room has a dedicated portion of the first resources that does not change and a second resource of the web conferencing server is dynamically allocated based on use during a web conference.

17. The web conferencing server of claim 16, in which the first resource comprises computational power and the second resource comprises communication bandwidth.

18. The web conferencing server of claim 15, further comprising providing different levels of security and confidentiality for different rooms hosted on the web conferencing server.

19. The web conferencing server of claim 18, in which:
security comprises controlling access to a web conferences and associated presentation materials by at least one of: encryption or verification of participants using a lightweight directory access protocol server; and
confidentially comprises controlling distribution of the content by deleting copies of a presentation on local machines or servers following a conference.

20. The web conferencing server of claim 13, wherein the partitions within the web conferencing server comprise a static allocation of resources for each web conferencing room based on a level of quality of service in each web conferencing room, a maximum capacity of participants in each web conferencing room, and
functionalities provided by the web conferencing application in each web conferencing room, such that the static allocation of computing resources is sufficient to provide the functionalities for the maximum capacity of participants with the quality of service for each web conferencing room, wherein the static allocation of resources for each web conferencing room is a division of computing capabilities of the web conferencing server and does not change unless the computing capabilities of the web conferencing server change, wherein the web conferencing server further comprises a jumpstart application to configure a presentation to meet organizational requirements including providing an organization on logo and header.

* * * * *